Sept. 5, 1933.  L. O. CARLSEN  1,925,726
GEAR CUTTING MACHINE
Filed Nov. 28, 1930  5 Sheets-Sheet 1

INVENTOR
Leonard O. Carlsen
BY
his ATTORNEY

Sept. 5, 1933.    L. O. CARLSEN    1,925,726
GEAR CUTTING MACHINE
Filed Nov. 28, 1930    5 Sheets-Sheet 2

INVENTOR
Leonard O. Carlsen
BY
his ATTORNEY

Sept. 5, 1933.     L. O. CARLSEN     1,925,726
GEAR CUTTING MACHINE
Filed Nov. 28, 1930     5 Sheets-Sheet 3

INVENTOR
Leonard O. Carlsen
BY
his ATTORNEY

Sept. 5, 1933. L. O. CARLSEN 1,925,726
GEAR CUTTING MACHINE
Filed Nov. 28, 1930 5 Sheets-Sheet 4
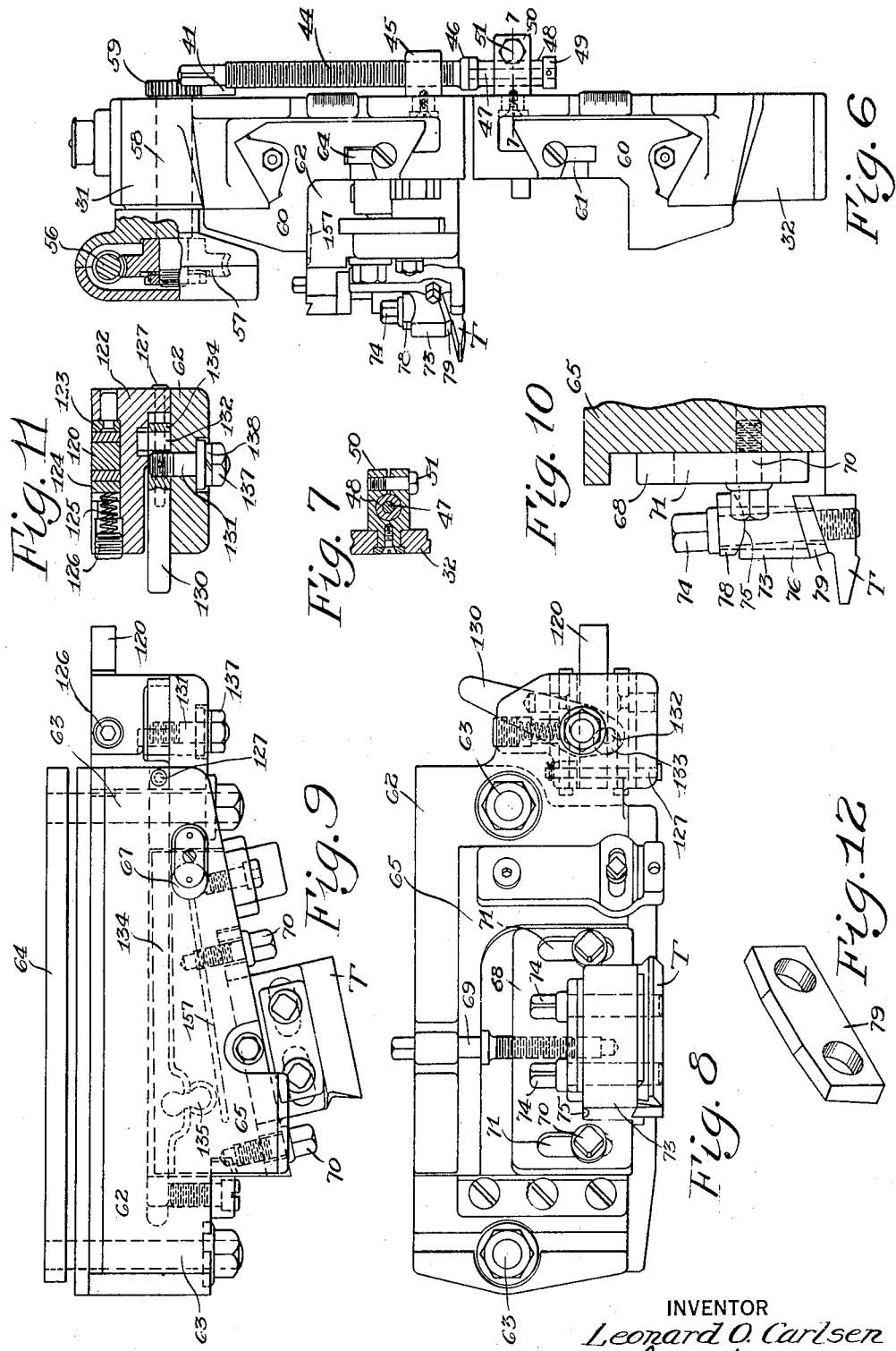
INVENTOR
Leonard O. Carlsen
BY
his ATTORNEY Patented Sept. 5, 1933

1,925,726

UNITED STATES PATENT OFFICE 1,925,726

GEAR CUTTING MACHINE

Leonard O. Carlsen, Rochester, N. Y., assignor to Gleason Works, Rochester, N. Y., a corporation of New York Application November 28, 1930
Serial No. 499,595

10 Claims. (Cl. 90—9)

The present invention relates to machines for producing gears and particularly to machines employing reciprocating tools for generating bevel and hypoid gears. In a more specific aspect, the subject of the present invention is a two-tool generating machine of the intermittent indexing type for cutting straight and skew bevel gears.

The primary purpose of this invention is to provide an improved form of two-tool generator for cutting straight and skew bevel gears which will have a wider range of usefulness and be more easily manipulable than machines of this type previously built and which at the same time will cut gears that are theoretically correct.

In one sense, the present invention constitutes an improvement over the invention disclosed in U. S. Letters Patent, No. 1,656,633 issued January 17, 1928, to E. C. Head et al. The machine illustrated in that patent is a two-tool straight bevel gear generator. The machine of the present invention can be employed for cutting either straight or skew bevel gears.

A preferred embodiment of the present invention is illustrated in the drawings. Like the machine of Patent No. 1,656,633, the present machine is a two-tool bevel gear generator of the intermittent indexing type. The tools are reciprocated to produce the cutting motion and the blank and the cradle simultaneously rotated to effect generation of the tooth profiles. The tools cut alternately, one tool being clapped out of cutting position while the other tool is cutting. The blank is fed into depth and a tooth fully generated and then the work head is withdrawn from operative position, the blank indexed, and the work head returned to enable cutting of the next tooth.

One of the features of the present machine is the mounting and adjustment of the tool slides and another the drive to the slides. In the preferred embodiment of the present invention, the tool slides are mounted upon the cradle for adjustment about a common axis offset from the axis of the cradle. They are adjustable together about this offset axis to position the tools for cutting skew teeth of the desired angle on a gear blank. They are adjustable relative to one another about the same axis in order to secure the desired tooth angle or taper of the teeth of the gear blank. The drive to the tool slides is from a shaft journaled coaxially of this offset axis and an adjustment is provided whereby, regardless of the angular positions of the tool slides, the two tools will be actuated to move symmetrically and cut symmetrically. Means are also provided for adjusting each tool laterally on its slide to secure the proper tooth thickness and for also tilting each tool to secure the desired tooth pressure angle of the gear despite the offset paths of movement of the tools.

Among the other features of the invention are the means for adjusting the throw of the tool crank, which determines the stroke of the tool slide, the means for lubricating the tool slides, and a safety device which prevents excessive roll of the cradle in either direction.

The principal features of the invention have already been disclosed. Other objects and features of the invention will be apparent hereinafter from the specification and from the recital of the appended claims.

In the drawings:

Figure 6 is an end elevation of the tool arms and slides, showing one of the tools in position, also;

Figure 7 is a detail sectional view on the line 7—7 of Figure 6;

Figure 8 is a front elevation of one of the tool heads;

Figure 9 is a plan view of the parts shown in Figure 8;

Figure 10 is a fragmentary view on an enlarged scale showing a detail of the tool mounting and in particular the means for adjusting one tool to the desired pressure angle;

Figure 11 is a sectional view showing a detail of the clapping mechanism and in particular the friction block and the means for manually manipulating the toggle bar;

Figure 12 is a perspective view of one of the shims such as are employed in adjusting the tool to the desired pressure angle;

Figure 2:
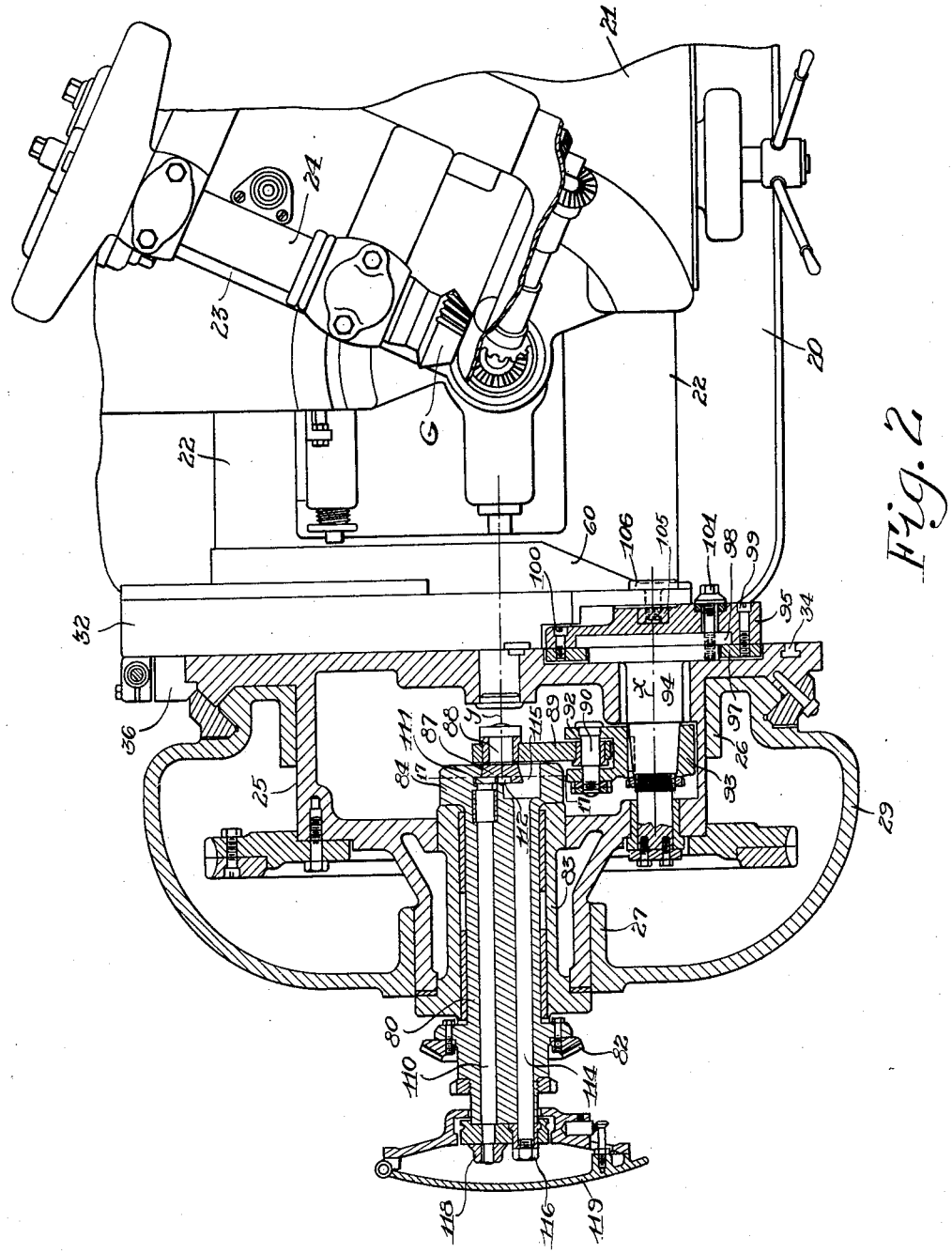
Figure 2 is a fragmentary plan view of the machine with the tool end shown in section.
Figure 17:
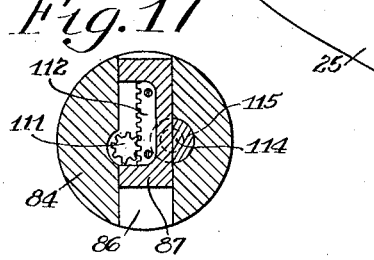

Figures 13 to 16 inclusive are diagrammatic views showing the use of the various tool adjustments and the manner of setting the machine to cut either straight or skew bevel gears; and Figure 17 is a section on the line 17—17 of Figure 2, showing details of the adjustment for length of tool stroke.

Referring to the drawings by numerals of reference, 20 indicates the base or frame of the machine. The work head carrier 21 slides on ways 22 formed on the base for the alternate feed and withdrawal movements of the blank. The work head 23 is adjustable angularly on the base to set the work head carrier in accordance with the cone angle of the gear to be cut. The gear blank G to be cut is mounted upon the rotatable work spindle 24 which is journaled in the work head.

The tool end of the machine is carried by a cradle 25 which is journaled in bearings 26 and 27 (Figure 2) in a column or upright 29 that is secured to the base 20 of the machine.

Figure 1:
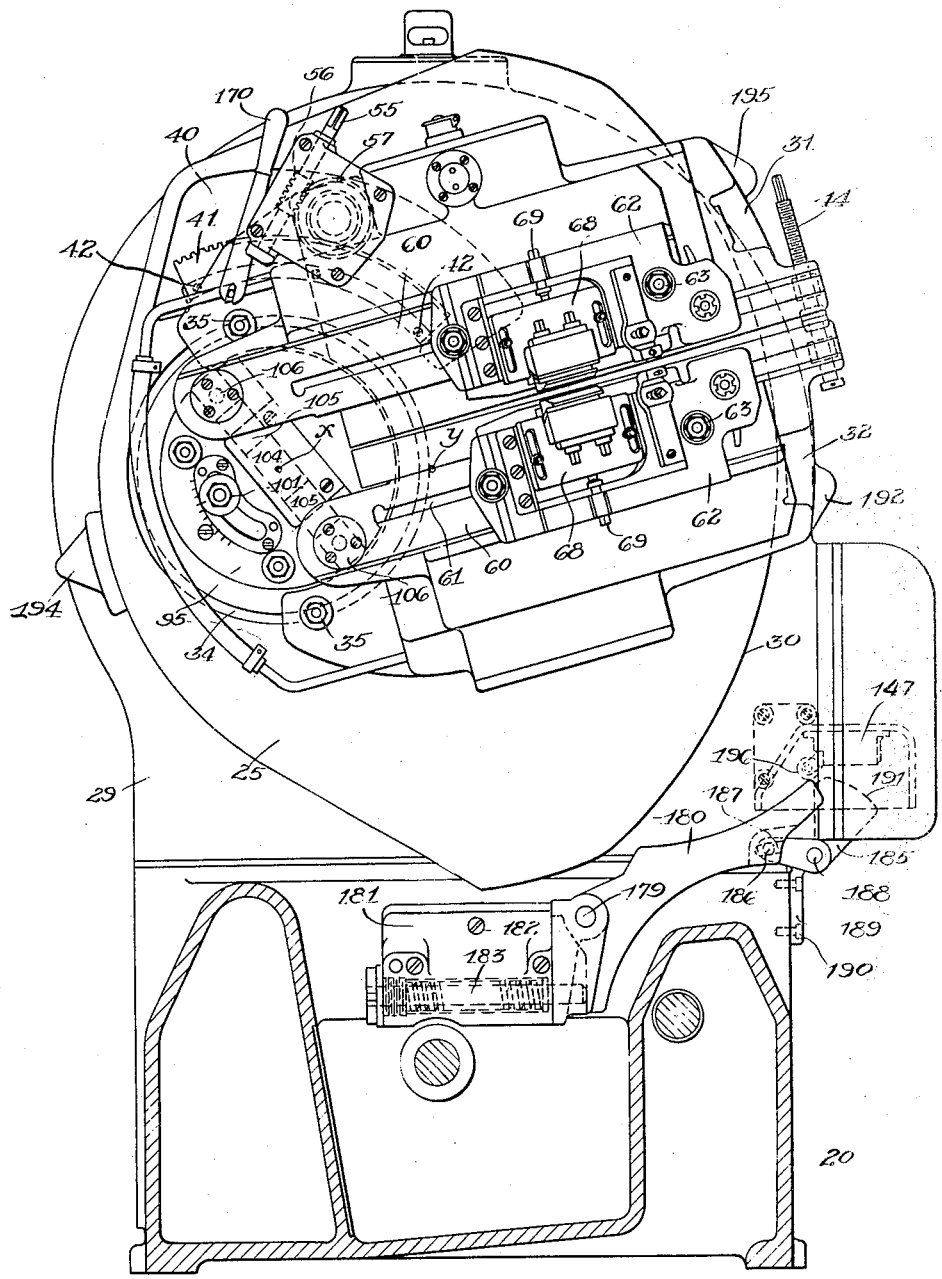
Figure 1 is a vertical sectional view through the machine, showing the tool end of the machine in elevation.
Figure 3:
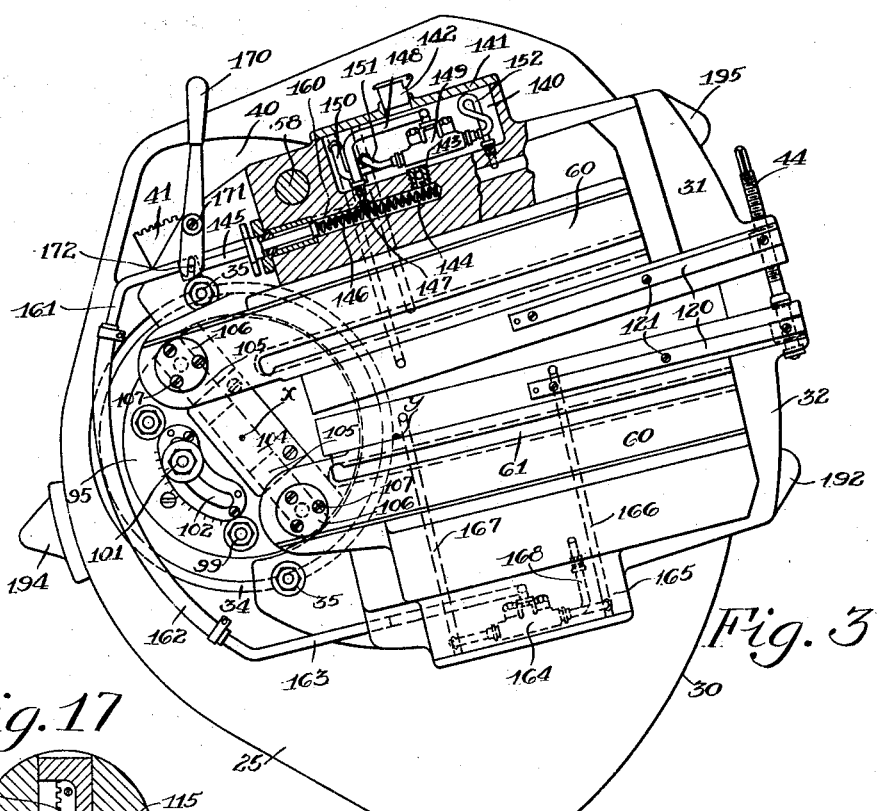
Figure 3 is a front elevation of the cradle and tool slides with the tools and tool blocks removed to show the lubricating system for the tool mechanism, parts being broken away to show this more clearly.

The face of the cradle is irregular in shape as clearly shown in Figures 1 and 3, but a portion of the periphery of the face of the cradle designated at 30, is arcuate in shape and curves about a center X offset from the center or axis Y of the cradle. Mounted on the face of the cradle for angular adjustment thereon are a pair of tool arms 31 and 32. A circular T-slot 34 is formed in the face of the cradle concentric of the center X. The tool arms 31 and 32 are held in any adjusted position on the cradle by T-bolts 35 which pass through the arms and engage in the T-slot 34. The arms 31 and 32 are frictionally held in position, also, by gibs 36 (Fig. 2) which are secured to the arms and which engage over the periphery of the arcuate portion 30 of the face of the cradle.

The face of the cradle is recessed as indicated at 40 and in this recess there is mounted a spur gear segment 41. This segment is secured to the cradle by screws 42. It is concentric of the center X.

The two arms 31 and 32 are adjustably secured together by a screw 44 (Figures 1, 3 and 6) that threads into a nut 45 which is swivelly secured to the arm 31. The screw 44 is formed with a shoulder 46 and with an unthreaded portion 47 below the threaded portion of the screw. The unthreaded portion 47 of the screw is mounted in a sleeve 48 and the sleeve 48 is held on the screw between the shoulder 46 and a collar 49 which is pinned to the screw at its lower end. The sleeve 48 is secured in a split clamp 50 which is clamped together by the bolt 51. The split clamp 50 is swivelly mounted on the lower tool arm 32. When the split clamp 50 is clamped about the sleeve 48 and the screw 44 is turned, the lower tool arm 32 can be adjusted angularly relative to the upper tool arm 31 about the axis X.

The two tool arms are adjustable together, also, angularly about this same axis X. This adjustment is effected by rotation of the stub shaft 55 which carries a worm 56 that meshes with a worm wheel 57. The worm wheel 57 is secured to a shaft 58 that is journaled in the arm 31 and this shaft 58 carries at its inner end a spur pinion 59 which meshes with the spur gear segment 41 which is secured to the cradle.

It will be readily seen that when the shaft 55 is turned, the two arms 31 and 32 will be adjusted together about the axis X and that when the screw 44 is turned the lower arm 32 will be adjusted angularly about this same axis toward or away from the upper arm 31. However, by fixing the lower arm in position and releasing the clamp 50, the upper arm may be adjusted angularly relative to the lower arm by rotation of the stub shaft 55. This latter method of changing the angle between the two arms is intended only for small adjustments as, for instance, when slight changes have to be made in tooth angle after preliminary cuts on a job. The sleeve 48 is elongated enough to permit this adjustment. The bolts 35 serve to secure the arms in position after they have been adjusted.

Each of the arms 31 and 32 is formed with a dove-tailed guide-way in which a tool slide 60 reciprocates. Each of the tool slides 60 has a longitudinal T-slot 61 formed in its front face. There is a tool head 62 mounted on each tool slide 60 and adjustable longitudinally thereon. The tool heads are secured in adjusted position on their respective slides by bolts 63 which thread into a bar 64 (Fig. 9) that engages in the corresponding T-slot 61. Each tool head 62 carries a clapper-block 65. Each clapper-block is pivotally mounted in its tool head for swinging movement about the pin 67 to carry the tool to and from cutting position.

There is a tool block or post 68 mounted on each of the clapper-blocks 65 and each of the tool blocks is adjustable on the corresponding clapper-block in a direction transverse to the direction of movement of the corresponding tool slide. The adjustment is effected, in each case, by a screw 69 which is secured in the clapper-block and which threads into the tool block 68. Each tool block can be secured in any adjusted position by means of bolts 70 which pass through elongated slots 71 formed in the tool block and which thread into the clapper-block.

There are two cutting tools, one for cutting one side face of the teeth of the blank and the other for cutting the opposite side faces of the teeth. Each tool T is secured to a projection 73 formed on its tool block 68 by screws 74. The upper face of the projection 73 is formed with a concave groove 75 along its full length as clearly shown in Figures 8 and 10. The lower face of each projection 73 is plane but angled to conform to the shape of the cutting tool. The screws 74 pass through openings 76 in the projection 73 and thread into the body portion of the tool T. A bearing block or bar 78 is interposed between the heads of the screws and the upper face of the projection 73. The lower face of this bearing block is convex, conforming in curvature to the groove 75 and permitting a rocking adjustment of the scews 74 in the openings 76. A shim 79 is interposed between the inside face of the tool and the lower face of the projection 73. A set of these shims 79 is supplied with the machine. The sides of these shims are plane but the different shims of the set have their sides inclined at different angles to one another. By selecting the proper shim 79, a standard tool T can be used and the tool tilted so that its effective cutting angle conforms to the pressure angle which it is desired to produce upon the gear blank. The bearing block 78 allows the screws 74 to be inclined in the slot 76 as may be required by the angle of the shim 79 used.

The drive to the tool slides is from a shaft 80 (Figures 2 and 5) which may be driven from the main drive shaft of the machine in any suitable manner as by means of the bevel gear 82. The shaft 80 is journaled in a sleeve 83 that is mounted in the cradle 25 and the shaft 80 is coaxial with the cradle. At its inner end the shaft 80 is formed to provide a crank-plate 84. The crank plate has a dove-tailed guide-slot cut diametrically across its face, as indicated at 86, and in this slot there is adjustably mounted a block 87. The block 87 is shaped to fit the groove 86 and carries a crank-pin 88 which is pivotally connected to one end of a link 89 that is pivotally connected at its opposite end to a pin 90. The pin 90 is secured in ears 92 formed on a sleeve member 93 which is keyed to a shaft 94 that is journaled in the cradle coaxially of the axis X.

The shaft 94 is formed with an enlarged head at its front end and to the head of this shaft 94 there is adjustably secured a circular actuating plate or cap 95. The actuating plate 95 is secured in any adjusted position on the head of the shaft 94 by the circular gib 97 which engages behind the flange 98 formed by the enlarged head of the shaft. The circular gib 97 is secured to the actuating plate by screws 99 and 100. There is also a clamping screw 101 that passes through an arcuate slot 102 in the plate 95 and threads into the head of the shaft 94. This clamping screw 101 assists the gib 97 in holding the actuating plate securely to the shaft 94 in any adjusted position. The slot 102 is curved about the axis X as a center and there are graduations provided on the plate 95 which read against a zero mark on the head of the screw 101 and which enable the actuating plate to be adjusted very accurately.

The actuating plate 95 is formed with a slot 104 which extends diametrically across its face. There are a pair of blocks 105 that slide in this slot 104. There is a headed pin 106 pivotally mounted in each of the blocks 105. These pins are secured by the screws 107 to the two tool slides 60.

It will be seen that as the shaft 80 rotates, an oscillatory motion will be imparted to the shaft 94 through the crank 84, block 87, crank-pin 88, link 89 and pin 90 and that this oscillatory motion will be imparted in turn to the actuating plate 95 which is secured to the shaft 94. The oscillatory motion of the actuating plate will be transmitted to the two tool slides, which are connected to the actuating plate at diametrically opposite points, as a reciprocatory motion and thus the tools will be reciprocated back and forth to cut the teeth in the blank.

The length of the tool strokes can be adjusted by adjusting the throw of the crank 84. For the purpose of effecting this adjustment, the block 87 is adjusted in the slot 86 to offset the crank pin 88 more or less from the axis of the shaft 80. To adjust the block 87 in the slot 86, a shaft 110 is provided. This shaft is journaled in the shaft 80 and carries at its forward end a spur pinion 111 that meshes with a rack 112 that is secured to the block 87. The block 87 is secured in any adjusted position by a draw-bar 114 which is formed with an enlarged clamping head 115 at its inner end that is shaped to engage with one beveled side face of the block 87. The draw-bar 114 extends through the shaft 80 and is manipulable from its rear end by threading up the nut 116. The enlarged head 115 of the draw-bar forms part of one side wall of the slot 86 and as the side walls are of dove-tailed shape, when the draw-bar is tightened up, the block 87 will be rigidly held in its adjusted position.

To assist in adjusting the block 87 accurately, the rear end of the shaft 110 may have a graduated dial 118 secured to it. A hinged guard 119 is mounted on the end of the shaft 80 to protect the dial 118 and nut 116.

Through the drive described, the tool slides 60 are reciprocated simultaneously in opposite directions. The tools cut alternately, one of the tools being out of cutting position while the other is cutting. The means for moving the tools to and from cutting position will now be described. There is a bar 120 secured by screws 121 to each of the tool arms 31 and 32 (Figures 3, 6 and 9) and a pair of friction blocks 122, one of which is secured to each of the tool heads 62 cooperate with these bars. Each of the friction blocks comprises a fixed friction-plate 123 and a movable friction-plate 124 that is resiliently held in position by a coil spring 125 which is housed in a hole drilled in the block 122. The tension of the spring can be adjusted by the nut 126 which closes the upper end of the hole or opening in which the spring is contained.

The friction plates 123 and 124 merely consist of hardened plates covered with any suitable friction material. Each friction block is secured by a pin 127 to a toggle bar 134 which is slidable in the corresponding tool head 62. Each toggle bar carries a toggle member 135 (Fig. 9) that engages the corresponding clapper block 65. In each of the tool heads 62 there is pivotally mounted a lever 130, studs 131 serving as the pivots for these levers. Each lever 130 carries a pin 132 that engages in an enlarged hole 133 in the friction block 122. Each stud 131 carries a nut 137 and a spring washer 138 and the friction produced by the spring washer is sufficient to hold the lever 130 in any position to which it is swung.

Due to the engagement of the friction block 122 which is mounted on the tool slide with the bar 120 which is secured to the relatively fixed tool arm, the clapper block 65 will be rocked in opposite directions at opposite ends of its stroke, moving the tool alternately to and from cutting position. The friction block and its action is not new. The same general type of clapping mechanism is described in Patent No. 1,656,633 above mentioned. The new feature of the machine illustrated in the drawings is the use of the levers 130 to manipulate the clapper blocks by hand. The levers 130 can be moved to swing the clapper blocks to and from cutting positions. This is desirable in gaging the position of the tools.

Figure 4:
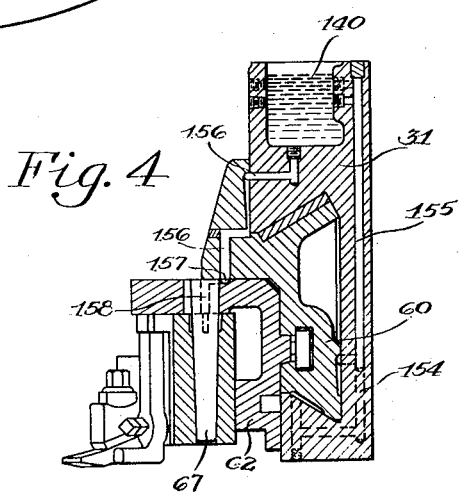
Figure 4 is a vertical sectional view of one of the tool arms and slides, further illustrating the lubricating system.
Figure 13:
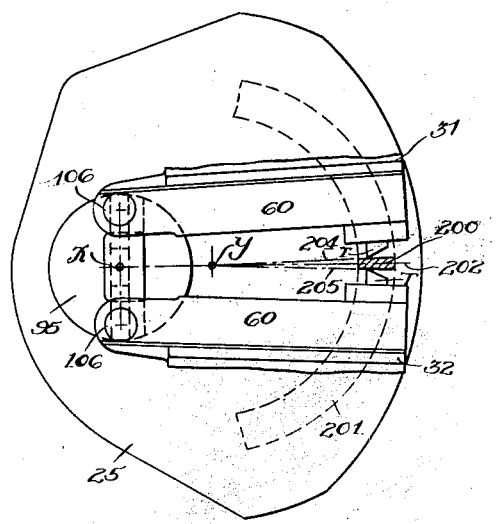

One of the features of the present machine is the lubricating system for the tool mechanism. The upper tool slide 31 is hollowed out to form a reservoir 140. This reservoir is covered by a cover plate 141 (Figure 3) and can be kept filled with oil through an oil cup 142. There is a port in the lower wall of the reservoir 140 which is closed by a ball-check valve 143 which is threaded into this port opening. Oil flowing through the check-valve, when this valve is open, flows into a duct 144. There is a plunger pump mounted on the arm 31 and the plunger 145 of this pump reciprocates in the duct 144. A coil spring 146 housed in the duct 144 serves to normally urge the plunger 145 outwardly of the duct 144. A duct 147 leads from the duct 144 into a pipe 148 that is connected to an oil fitting 149. The fitting 149 has various pipes 150, 151 and 152 leading from it to various ducts that supply lubricant to the movable parts mounted on the arm 31. The duct 150 communicates with a duct 154 (Figure 4) and supplies lubricant to the lower surface of the tool slide 60. The duct 151 communicates with a duct 155 to supply lubricant to the rear surface of the tool slide 60. The duct 152 communicates with a duct 156 that conducts the lubricant into a groove 157 formed in the upper face of the tool head 62 and the lubricant flows along this groove into a duct 158 that supplies lubricant for the pin 67 of the clapper block.

The duct 147 communicates not only with the pipe 148 that leads to the fitting 149 but also with a duct 160 that leads into a pipe 161 which is connected by piping 162 and 163 with a second fitting 164 that is contained in a chamber 165 in the lower tool slide 32. Ducts 166, 167 and 168 lead from this fitting to the various parts of the lower tool slide to supply lubricant to these parts for the same purpose that lubricant is supplied to the parts of the upper tool slide by the ducts 154, 155 and 156.

The plunger pump is actuated by a hand lever 170 that is pivotally secured to the upper arm 31 by a screw 171 and that is furcated at its lower end to engage a pin 172 which is secured in the head of the plunger 145. When the lever 170 is moved to the right from the position shown in Figure 3, the plunger 145 is forced into the duct 144 closing the check valve 143 and forcing the oil from the duct 144 into the pipe 148 to the fitting 149 and through the piping 160, 161, 162 and 163 to the fitting 164, thereby forcing lubricant to the various movable parts of the upper and lower tool arms. As soon as the operator releases the lever 170, it will be moved back to the position shown in Figure 3 by operation of the spring 146 and the suction created by this movement of the plunger 145 will open the check-valve 143 causing more oil to flow from the reservoir 140 into the duct 144. The plunger pump provides, therefore, a very simple means for simultaneously lubricating the movable parts of both arms whenever the operator desires to do so.

While the teeth are being cut in the blank, a generating roll is imparted to the cradle and to the work. The amount of the generating roll is governed by any suitable means, as, for instance, change gears. To prevent the operator from damaging the machine in event that he attempts to cut a job beyond the capacity of the machine, a safety device has been provided which will stop the cradle roll before the tool arms can roll down into the base of the machine. This safety device is illustrated in Figure 1. 180 designates a lever arm that is pivoted to a bracket 181 which is secured by screws 182 to the base of the machine in the well formed between the face of the cradle and the inner end of the work head slide. This lever 180 is a double-armed lever. The longer arm of the lever is formed with a cam surface on its upper side while the shorter arm of the lever is engaged by a spring pressed plunger 183 that is housed in the bracket 181. The plunger 183 serves to urge the long arm of the lever constantly into operative position. A bell-crank member 185 is connected to the long arm of the lever 180 by a pin 186 that engages in a slot 187 in the long arm of the lever 180. The bellcrank lever 185 is pivotally mounted at 188 on a bracket 189 which is secured by screws 190 to one side of the base of the machine. The peripheral surface 191 of the free arm of the bellcrank lever 185 is formed as a cam surface eccentric of the pivot pin 188. Lugs 192 and 195 are formed on the tool arms 32 and 31, respectively, in position to engage the long arm of the lever 180 in event of excess roll of the cradle 25 in one direction. There is a lug 194 secured to the cradle 25 itself which is in position to engage the long arm of the lever 180 in event of excess roll of the cradle in the opposite direction.

Figure 14:
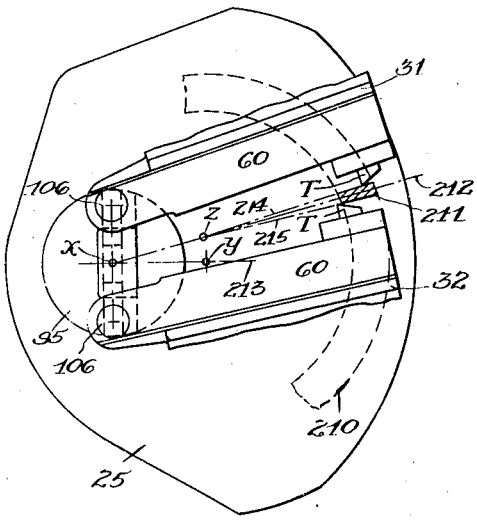
Figure 15:
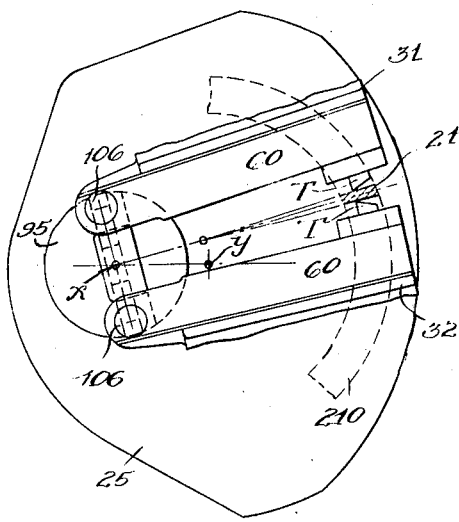
Figure 16:
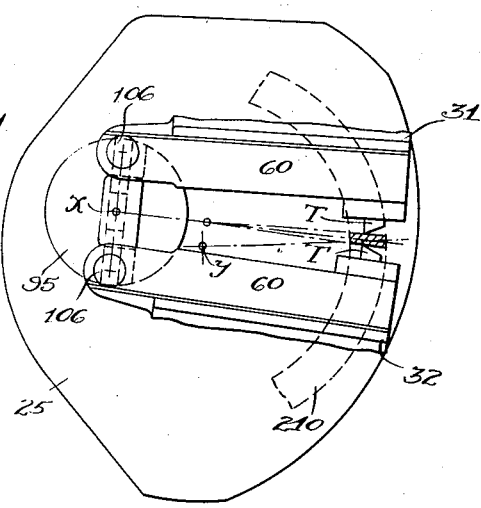

When the tool arms are adjusted to cut a gear such as shown in Figures 14 to 16 of the drawings, should the cradle roll beyond its safe limit in one direction, the lug 192 would engage the arm 180 and rock the arm about its pivot 179 against the resistance of the spring-pressed plunger 183. The rocking movement of the lever 180 would be transmitted to the bellcrank lever 185, rocking the lever 185 to bring the cam surface 191 of that lever into engagement with the roller 196 of a switch 197 that is secured in any suitable position on the column 29 and is normally closed. The rocking of the lever 185 will cause the switch 197 to be opened and the machine will stop. Should the cradle roll beyond the safe limit in the opposite direction, the lug 194 would engage the lever 180 and trip the switch 197. When the arms 31 and 32 are adjusted to cut a gear of opposite hand to that shown in Figures 14 to 16, it will be the lug 195 which will trip the switch if the cradle rolls beyond the safe limit in one direction while the lug 194 will function, as before, to trip the switch in case of roll beyond the safe limit in the opposite direction.

The means for rotating and indexing the work spindle, the means for oscillating the cradle, the means for moving the work slide to and from cutting position and the means for driving the crank shaft 80 form no part of the present invention. These various drives and mechanisms may be of any suitable construction, such as usually employed in gear cutting machines. One possible construction is illustrated in Patent No. 1,656,633 above mentioned.

In a bevel or hypoid gear generating machine, the axis of the cradle represents the axis of the crown gear or other basic gear to which the gear to be cut is to be generated conjugate. The cutting tools represent tooth surfaces of the basic generating gear. To cut a gear conjugate to a basic gear that has straight radial teeth, the cutting tools must move toward the axis of the cradle, that is, the tool paths, if two reciprocating tools are used, must converge in a point lying on the axis of the cradle. A crown gear or other gear which has skew teeth has teeth which are oblique, that is, non-axial. To generate correctly a gear conjugate to a crown gear or other basic gear having skew teeth, the cutting tools must move in paths which are offset from the axis of the cradle and the amount of their offset will depend upon the obliquity of the teeth of the basic generating gear. The present machine is constructed so that it will cut gears conjugate to a basic gear having straight radial teeth as well as gears conjugate to a basic gear having skew or non-radial teeth.

Figure 5:
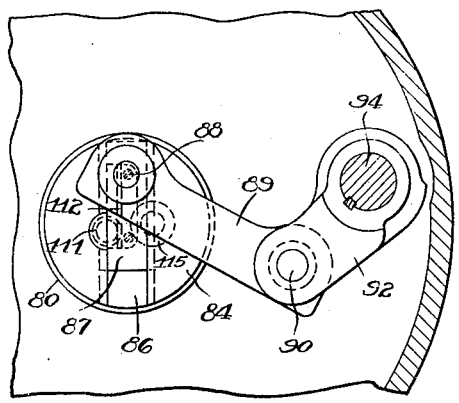
Figure 5 is a fragmentary view showing a detail of the tool drive.

The manner in which the present machine can be employed to cut both gears conjugate to straight as well as skew tooth basic gears and the purpose of the various tool adjustments are illustrated diagrammatically in Figures 13 to 16 inclusive. An imaginary generating gear having straight radial teeth 200 is indicated at 201. The teeth of this gear are radial of its axis Y which is represented by the axis of the cradle 25, and the sides of the teeth converge in a point lying on this axis Y. To generate a gear conjugate to the imaginary gear 201 the tool arms 31 and 32 are adjusted by the worm 56, worm wheel 57, pinion 59 and segment 41 into the zero position of their angular adjustment about the axis X or until a line 202 passing medially through the tooth 200 of the basic generating gear passes also through the axes Y and X. The tool arms are opened, however, relative to one another to secure the correct tooth angle or taper of the teeth by rotating the screw 44. This adjustment opens the tools relatively to one another to an angle corresponding to the angle between the lines 204 and 205 that bound the opposite side surfaces of one of the teeth 200 of the basic gear 201. The tool slides converge to the point X as a center, but the tools are to represent a gear 201 having teeth 200 whose side surfaces converge to the point Y as a center. To generate teeth of the proper thickness and convergence, therefore, it is necessary to adjust the tool blocks 68 laterally on their heads 62 by means of the screws 69. The tool heads 62 can be adjusted longitudinally on the tool slides 60 in accordance with the cone distance of the crown gear teeth while the length of stroke of the tools will be adjusted by adjusting the block 87 (Figure 5). The length of stroke will depend upon the length of the teeth to be cut. The arms can be brought to the center of the roll, that is, to the position shown in Figure 13 before starting to cut by adjusting the cradle on its axis.

Figures 14 to 16 inclusive show how the machine may be set up for cutting a gear conjugate to a basic gear having skew teeth. 210 designates the imaginary basic generating gear which has skew teeth 211, that is, teeth which are offset from, and non-radial of the axis Y of the gear. To generate a gear conjugate to the gear 210, the arms 31 and 32 are adjusted angularly on the face of the cradle, by rotating the worm shaft 55, worm 56, worm wheel 57, and pinion 59, in accordance with the obliquity of the teeth 211 of the imaginary generating gear 210. The angle to which the arms are adjusted corresponds to the angle which the line 212 passing through the center of the tooth 211 makes with a line 213 passing through the centers X and Y. In the angular adjustment of the arms 31 and 32, the slides 60 will, of course, swing about the pivot pins 106 which connect these arms with the actuating plate 95. The arms can be opened up relative to one another in accordance with the tooth angle to be produced by adjusting the lower arm 32 relative to the upper arm 31 by rotating the screw 44. The tooth angle is determined by the angle between the sides of the teeth 211 of the basic generating gear 210. To secure the desired tooth thickness, the tool blocks 68 are adjusted laterally on their respective slides 60 by the screws 69. Then the tools will move along lines 214 and 215 which converge in a point Z and which correspond to the sides of the teeth 211 of the imaginary generating gear 210.

If these adjustments were made and nothing more were done, it would be seen that the cutting tools T would not cut symmetrically. The strokes of the two tools are equal, both being driven from the actuating plate 95. The upper tool would move in a path which has a rearward limit much further away from the axis Y than the rearward limit of the path of movement of the lower tool and the inner limit of the stroke of the upper tool would be, also, further away from the axis Y than the inner limit of movement of the lower tool. It is to overcome this unsymmetrical condition and to avoid it that the actuating plate 95 has been made adjustable on the shaft 94.

Figure 15 shows what happens when the actuating plate 95 has been adjusted to the correct angle on the head of the shaft 94 in which the two tool slides 60 have a symmetrical position and the two tools are at the center of the face of the tooth 211 at the middle of their strokes. The setting of the actuating plate on the shaft 94 can be made very accurately by the graduations provided on the plate which read against a zero mark on the head of the clamping screw 101. Before starting the cut, it is desirable to adjust the tools so that they will be at the center of the roll and both will generate the two opposite tooth profiles fully in the generating roll before the work head is withdrawn for indexing. To position the tools at the center of the roll, all that is necessary to do is to rotate the cradle 25 by hand. This causes the actuating plate to travel about the axis Y of the cradle as a center. The positions of the tools at the center of the roll is shown in Figure 16.

While the obliquity of the teeth has been described as being obtained by adjustment of the arms 31 and 32 together and the tooth angle adjustment has been described as obtained by adjustment of the lower arm with reference to the upper arm, it will be seen that the lateral adjustment of the tool blocks 68 on the tool slides permits of a wide combination of adjustments and these three adjustments can be combined in various ways to obtain the same results.

The selection of the shims 79 to be used with the two tools depends upon the pressure angles to be produced upon the opposite sides of the teeth. In cutting a skew tooth, if the same pressure angle is to be cut on the opposite sides of the tooth, tools T of the same pressure angles may be used but the shims 79 used with the two tools will have different angles. One tool is moving further away from the center of the cradle than the other tool and the influence of the cradle roll upon the tooth pressure angles is different, therefore, in the case of one tool than in the case of the other.

While the machine shown is for the purpose of cutting straight and skew bevel gears, it will be understood that the features of this invention are applicable, also, in the case of a machine for cutting straight hypoid gears. In fact, all that is necessary in order to cut straight hypoid gears on the machine shown is to substitute for the work head shown a work head having an adjustment whereby the axis of the work spindle may be offset from the axis of the cradle. Such a work head is shown on the machine of the patent of Ernest Wildhaber, No. 1,724,241 of August 13, 1929. While the invention is particularly applicable to a machine of the intermittent indexing type, there are certain features of the invention which may be employed on machines of the continuous indexing type and as to these features, I do not wish to limit the invention to machines of the intermittent indexing type. In general it may be said that while a preferred embodiment of the invention has been described, the invention is capable of further modification and that this application is intended to cover any variations, uses, or adaptations of the invention following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. In a machine for generating tapered gears, a work support, an oscillatory cradle, a shaft journaled in the cradle with its axis offset from the axis of the cradle, a pair of tool slides mounted on the cradle and adjustable angularly thereon about the axis of said shaft and adjustable angularly with reference to one another about the same axis, a tool block mounted on each slide and adjustable thereon in a direction transverse to the direction of movement of the slide, a tool carried by each block, and means for reciprocating said tool slides comprising means for oscillating said shaft, an actuating plate adjustable angularly on the shaft, means for securing the plate to the shaft in any adjusted position, and means connecting the tool slides to the plate at diametrically opposite points.

2. In a machine for generating tapered gears, the combination with a rotatable cradle and a rotatable work support, of a pair of arms mounted on the cradle for adjustment about an axis offset from the axis of the cradle, said arms being adjustable by means comprising a member releasably connected to one arm and having threaded engagement with the other arm for adjusting said arms relative to one another, and a rotary shaft journaled in one arm, a gear mounted on said shaft, and a gear connected to the cradle with which gear said first named gear meshes, and a tool slide carried by each arm.

3. In a machine for generating tapered gears, the combination with a rotatable cradle and a rotatable work support, of an oscillatory shaft journaled in the cradle with its axis offset from the axis of the cradle, a pair of arms mounted on the cradle for adjustment about the axis of said shaft, said adjustment being effected by means comprising a member releasably connected to one arm and having threaded engagement with the other arm for adjusting said arms relative to one another, and a rotary shaft journaled in one arm, a gear mounted on the latter shaft, and a gear secured to the cradle with which gear said first named gear meshes, a tool slide reciprocatory on each arm, a tool carried by each slide, and means for reciprocating said slides comprising an actuating plate adjustable angularly on the first named shaft, means for securing the actuating plate to the first named shaft in any adjusted position, means connecting said slides to the plate at diametrically opposite points, and means for oscillating the first named shaft.

4. In a gear cutting machine, a work support, a reciprocatory tool slide, a tool carried thereby, means for reciprocating said slide comprising an oscillatory shaft which is connected to the tool slide, a rotary spindle, a crank-plate secured to the inner end of said spindle and having a slot extending diametrically across its face, a block mounted in said slot, and a link pivotally connected at one end to said block and at its other end to the oscillatory shaft, means for adjusting the block in the slot of the crank plate to adjust the stroke of the tool slide comprising a rack secured to said block, a rotary shaft journaled in the rotary spindle and extending there-through to the back of the machine, and a pinion carried by said rotary shaft and meshing with said rack, and a clamping member engaging said block and having a draw-bar secured thereto which, also, extends through said spindle and is manipulable from the back of the machine.

5. In a machine for generating tapered gears, a work support, a rotatable cradle, a pair of reciprocatory tool slides, a tool carried by each slide, means for reciprocating said slides comprising an actuating plate, means connecting said slides to said plate, an oscillatory shaft to which said plate is secured for angular adjustment thereon, said shaft being journaled in the cradle with its axis offset from the axis of the cradle, a rotary spindle journaled in the cradle with its axis coaxial with the axis of the cradle, a crank-plate secured to said spindle and having a slot extending diametrically across its face, a block mounted in said slot, and a link pivotally connected at one end to said block and at the other end to the oscillatory shaft, means for adjusting the block in the slot of the crank plate to adjust the stroke of the tool slides comprising a rack secured to the block, a rotary shaft journaled in the spindle and extending there-through to the back of the cradle, and a pinion carried by the latter shaft and meshing with the rack, a clamping member adapted to engage said block to secure it in any adjusted position, and a draw-bar for actuating said clamping member into operative position, said draw-bar being also mounted to extend through the rotary shaft to the back of the cradle whereby the block may be manipulated for adjusting and clamping from the back of the cradle.

6. In a machine for producing gears, the combination with a work support, of a tool mechanism comprising a tool block having a plane lower face and a concave upper face, a reciprocatory tool having a side cutting edge, a bolt for securing the tool to said block, a shim having plane side faces which is interposed between one side of the tool and the lower face of the block, and a bearing block which is interposed between the head of the bolt and the upper face of the tool block, said bearing block having a convex face seating in the concave face of the tool block, and said shim having its side surfaces inclined at a definite angle to one another, said shim being removable to permit substitution of another shim having said faces inclined to one another at a different angle, the selection of the shim depending on the pressure angle of the tool and of the gear to be produced.

7. In a machine for generating tapered gears, the combination with a rotatable cradle, of a pair of tool slides mounted on the cradle and adjustable angularly thereon about an axis offset from the axis of the cradle and adjustable angularly, also, with reference to one another about the same axis, a tool block mounted on each slide and adjustable theron in a direction transverse to the direction of movement of the corresponding slide, a tool support tiltably adjustable on each block whereby the tool mounted thereon may be adjusted in accordance with the pressure angle of the gear tooth surfaces to be cut, and means for recoprocating said slides.

8. In a machine for producing gears, a work support, tool mechanism, and a cradle upon which one of said parts is mounted, said tool mechanism comprising a pair of arms adjustable angularly about an axis offset from the axis of the cradle, a pair of slides reciprocable on said arms, a pair of tool blocks adjustable laterally on said slides, tools mounted on said blocks, and means for reciprocating said slides.

9. In a machine for producing gears, a work support, tool mechanism, and a cradle upon which one of said parts is mounted, said tool mechanism comprising a pair of arms adjustable both bodily and relative to one another about an axis offset from the axis of the cradle, a pair of slides reciprocable on said arms, a pair of tool blocks adjustable laterally on said slides, tools mounted on said blocks, and means for reciprocating said slides.

10. In a machine for producing gears, a work support, tool mechanism, and a cradle upon which one of said parts is mounted, said tool mechanism comprising a pair of arms adjustable angularly about an axis offset from the axis of the cradle, a pair of slides reciprocable on said arms, a pair of tool blocks adjustable laterally on said slides, tools mounted on said blocks, and means for reciprocating said slides comprising an oscillatory shaft whose axis coincides with the axis about which said arms adjust, an actuating plate secured to said shaft and adjustable angularly thereon about the axis of said shaft, means connecting the tool slides to said plate at diametrically opposite points, and means for oscillating said shaft.

LEONARD O. CARLSEN.